United States Patent [19]
Wegner

[11] 4,343,482
[45] Aug. 10, 1982

[54] WHEELCHAIR

[76] Inventor: Dieter F. Wegner, P.O. Box 222, Menomonee Falls, Wis. 53051

[21] Appl. No.: 127,100

[22] Filed: Mar. 4, 1980

[51] Int. Cl.[3] .......... B62B 11/00
[52] U.S. Cl. .......... 280/42; 280/650; 280/47.4; 297/DIG. 4; 297/42; 297/45
[58] Field of Search .......... 280/42, 647, 650, 47.4, 280/242 WC; 4/480, 483, 254; 5/90; 297/DIG. 4, 42, 43, 44, 45

[56] References Cited

U.S. PATENT DOCUMENTS

| | | | |
|---|---|---|---|
| 2,592,405 | 4/1952 | Everest et al. | 297/DIG. 4 |
| 3,142,351 | 7/1964 | Green | 280/42 X |
| 3,301,574 | 1/1967 | Good | 280/242 WC |
| 4,007,959 | 2/1977 | Juergens | 297/42 |
| 4,232,897 | 11/1980 | Maclaren | 280/647 |

FOREIGN PATENT DOCUMENTS

| | | | |
|---|---|---|---|
| 434236 | of 1912 | United Kingdom | 280/42 |

*Primary Examiner*—Joseph F. Peters, Jr.
*Assistant Examiner*—Donald W. Underwood
*Attorney, Agent, or Firm*—Fred Wiviott

[57] ABSTRACT

A wheelchair for permitting handicapped persons to use a toilet without dismounting or assistance includes a frame having side portions interconnected by collapsible braces and a seat having a removable center section. The seat is also removable from the frame and includes front and rear braces extending perpendicularly to the side frames and cooperating therewith to rigidify the assembly. First and second collapsible braces extend respectively across the front and the back of the chair and each is pivotally mounted to the opposite sides of the frame and hinged intermediate its ends for collapsing in a generally horizontal direction and a third brace extends across the back of the chair and each is pivotally mounted to the opposite sides of the frame and hinged intermediate its ends for collapsing in a generally horizontal direction and a third brace extends across the back of the chair and is pivotally connected at its opposite ends to the side of the frame and intermediate ends for collapsing in a generally vertical direction.

3 Claims, 6 Drawing Figures

WHEELCHAIR

BACKGROUND OF THE INVENTION

This invention relates to wheelchairs and more particularly to a collapsible wheelchair which permits a handicapped person to use a toilet without dismounting or assistance.

Handicapped persons confined to conventional wheelchairs must dismount or be assisted from such chairs if they desire to use toilet facilities. Those who are unable to dismount and seat themselves on the toilet without aid cannot be left unattended for long periods of time. This restricts mobility and otherwise may result in the premature commitment to care facilities.

One prior art attempt to solve this problem is disclosed in U.S. Pat. No. 4,007,959. The wheelchair disclosed in that patent has no frame members in the rear portion of the chair and below seat level. This permitted the chair to be backed over a toilet. In addition, the central portion of the seat was removable to permit the handicapped person to use toilet facilities while seated in the chair. Such prior art wheelchairs were not wholly satisfactory, however, because the absence of lateral bracing and particularly in the rear portion of the chair tended to result in a lack of rigidity particularly when the central portion of the seat was removed. In addition, such prior art wheelchairs were not fully collapsible.

SUMMARY OF THE INVENTION

It is a primary object of the invention to provide a collapsible wheelchair which permits an occupant to use toilet facilities without dismounting the chair.

A further object of the invention is to provide a wheelchair which permits use of toilet facilities which is rigid when in use but otherwise fully collapsible.

These and other objects and advantages of the present invention will become more apparent from the detailed description thereof taken with the accompanying drawings.

In general terms, the invention includes a wheelchair having side frames and front and rear brace means each comprising a pair of braces which are pivotally interconnected at one end and are pivotally connected to the opposite side frames at their other ends for permitting the side frames to collapse toward each other, one of the braces being collapsible in a generally horizontal direction, the other in a generally vertical direction, a seat having a frame and being releasably mountable on the side frames to rigidify the chair, the center section of the seat being removable from the frame to permit the occupant of the chair to use a toilet without diminishing the rigidity of the chair.

PREFERRED EMBODIMENT OF THE INVENTION

Figure 2:
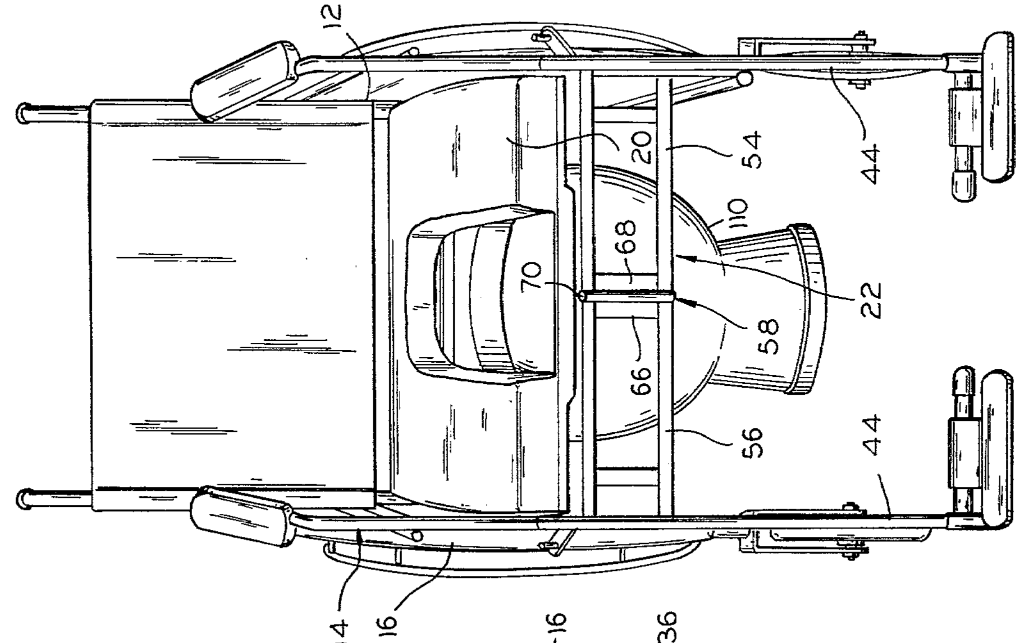
FIG. 2 is a front perspective view of the wheelchair in accordance with the present invention in position over a toilet.
Figure 1:
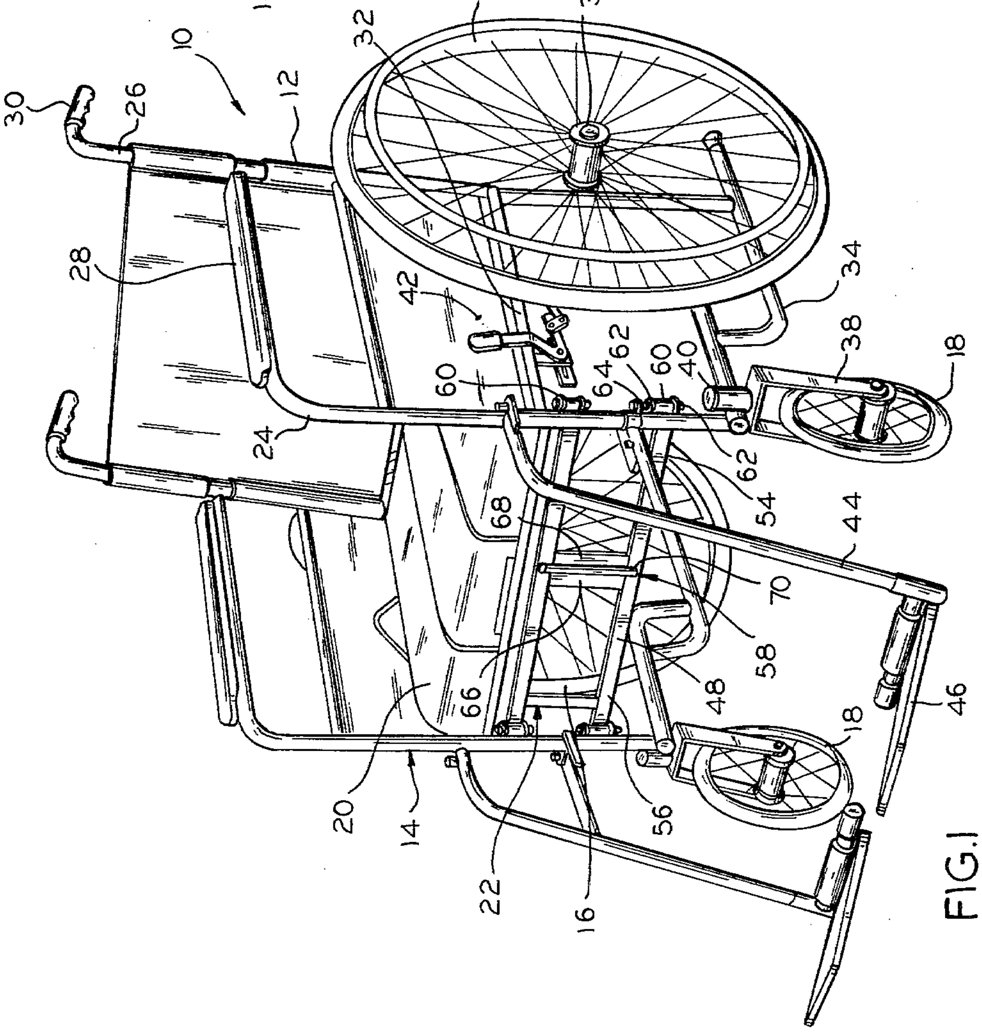
FIG. 1 is a perspective view of the wheelchair in accordance with the preferred embodiment of the invention.

The drawings show a wheelchair 10 having a pair of side frames 12 and 14 upon which a main wheel 16 and an auxiliary caster wheel 18 are mounted. A removable seat 20 and an articulated linkage 22 bridge the side frames and permit the chair 10 to be collapsed when the seat 20 is removed.

The frames 12 and 14 are identical except that each is the mirror image of the other and accordingly only frame 12 will be discussed in detail for the sake of brevity. However, corresponding portions of each side frame will be identified by the same reference numeral.

The frame 12 may be formed of any suitable material, such as tubular metallic members, and may, for example, comprise a first, inverted generally L-shaped member 24 which extends upwardly along the front of the chair and rearwardly where it engages a generally vertically extending rear frame member 26. An arm rest 28 may be mounted on the rearwardly extending portion of frame member 24 and the upper end of member 26 may be bent rearwardly for receiving a handgrip 30. Extending between the vertical portion of the front frame 24 and the vertical frame member 26 and at a point immediately below the seat 20 is an intermediate frame member 32 while the lower ends of members 24 and 26 are joined by a bottom frame member 34. Those skilled in the art will appreciate that the frame members may be interconnected in any suitable manner such as by welding.

The main wheel 16 is of a type conventionally used on wheelchairs and has a central hub 36 which is mounted on the rear frame member 26 between the cross members 32 and 34 and for rotation about a horizontal axis. The front wheel 18 is also of a type conventionally used on wheelchairs and is relatively smaller than the main wheel 16. Wheel 18 is mounted for rotation about a generally horizontal axis between the arms of a yoke 38 pivotally mounted for rotation about a vertical axis in a bearing 40 which is affixed to the front frame member 24. A conventional handbrake 42 may be mounted on cross member 32 and adjacent the wheel 16 to permit the latter to be locked in position. Finally, a forwardly and downwardly extending tubular member 44 is pivotally and removably mounted on the frame member 24 adjacent the front of seat 20 and carries a foot rest 46 at its lower end.

The side frames 12 and 14 are joined by linkage 22 which includes a front brace 48 and first and second rear braces 50 and 52. Front brace 48 includes a pair of generally rectangular brace members 54 and 56 which are respectively pivotally connected at one end to the side frames 12 and 14 at a point below seat 20 and are pivotally interconnected at their other ends by a hinge 58. More specifically, each bracket member has a pair of spaced hinges 60 which are received between horizontally spaced apart brackets 62 affixed to the front frame member 24. A hinge pin 64 extends vertically through aligned openings in the brackets 62 and through the hinges 60. The hinge 58 includes first and second mating hinge portions 66 and 68 respectively formed on the ends of brace members 54 and 56 and a hinge pin 70 which extends vertically therethrough. The hinge 58 is constructed and arranged to permit the pivotal movement of the brace members 54 and 56 in a single direction and toward the rear of the chair 10.

Figure 3:
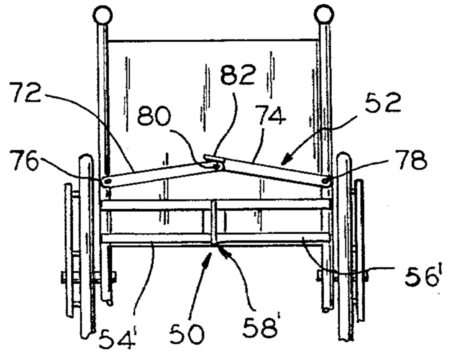
FIG. 3 is a rear perspective view of the wheelchair according to the invention.
Figure 4:
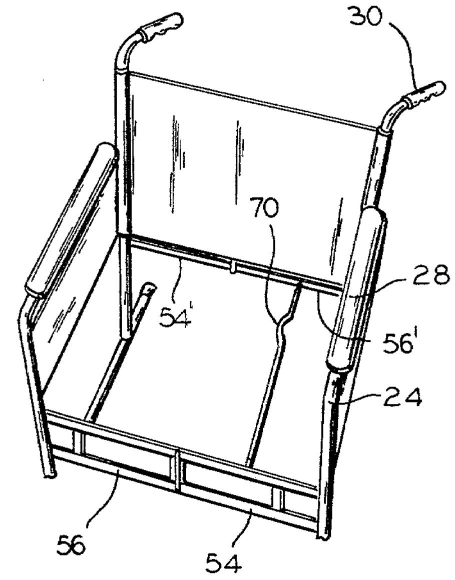
FIG. 4 is a top perspective view of the wheelchair in accordance with the invention with the seat removed.

The first rear brace 50 is shown in FIG. 3 to be identical with front brace 48 and will therefore not be discussed in detail for the sake of brevity. Corresponding portions of rear brace 50 are, however, identified by the same reference numerals as front brace 48 except that they are distinguished by a prime ('). Also, it will be seen that rear brace 50 is mounted to the side frames 12 and 14 at an elevation such that its lower edge is at approximately the same elevation as that of seat 20. The hinge 58' of rear brace 50 is also constructed and arranged so that it will collapse in a rearward direction and the front and rear braces 48 and 50 are interconnected by a strut 70 which extends therebetween (FIG. 4). The second rear brace 52 includes a pair of brace members 72 and 74 which are respectively connected for pivotal movement to the rear frame members 26 of side frames 12 and 14 and for pivotal movement about horizontal axes by pivot pins 76 and 78. The brace members 72 and 74 are also pivotally interconnected at their other ends by a pivot pin 80 which extends through each. Also formed on the end of brace member 74 is a stop 82 which extends over and engages the upper edge of brace member 72. The stop 82 limits the pivotal movement of the brace members 72 and 74 in the downward direction to a position where they are not quite in horizontal alignment. This insures that the members 72 and 74 will readily pivot upwardly.

Figure 5:
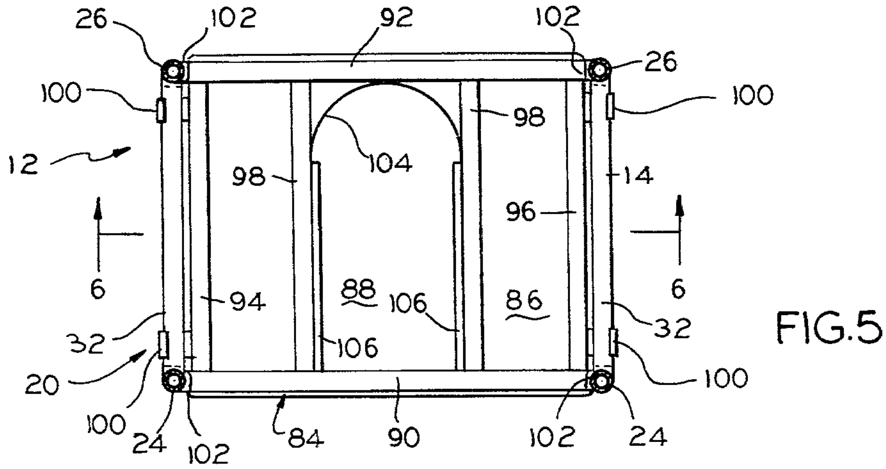
FIG. 5 is a bottom view of the seat portion of the wheelchair of FIG. 1.
Figure 6:
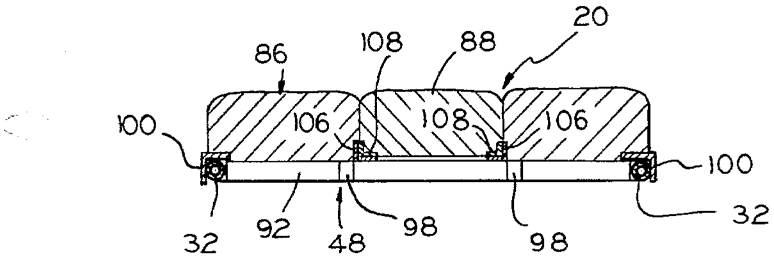
FIG. 6 is a view taken along lines 6—6 of FIG. 5.

The seat 20 as shown in FIGS. 5 and 6 to include a frame 84, a generally U-shaped seat 86 and a removable center cushion 88. The frame 84 is formed of solid or tubular metallic members, depending on the material, which are secured in any suitable relation, such as by welding, and is generally rectangular in plan view. Specifically, frame 84 includes generally parallel front and rear members 90 and 92 and end members 94 and 96 which extend perpendicularly between the ends of front and rear members 90 and 92. In addition, intermediate frame members 98 extend between the front and rear frame members 90 and 92 and in a generally perpendicular relation.

The length of the front and rear frame members 90 and 92 are substantially equal to the distance between the side frames 12 and 14 when the front and rear braces 48 and 50 are fully extended. In addition, a pair of hangers 100 are affixed to each of the end frame members 94 and 96 and each is generally L-shaped in vertical cross-section as seen in FIG. 6 and extends over the adjacent cross member 32 of side frames 12 and 14 whereby the seat 20 is removably supported. In addition, there is an arcuate metallic end plate 102 affixed to each end of the front and rear frame members 90 and 92 and which extends around the adjacent vertical frame members 24 and 26 for retaining seat 20 in position when hangers 100 are disposed over cross frame members 32. It will thus be appreciated that when the seat 20 is in position it will provide rigidity to the chair and will prevent collapsing of the front and rear braces 48, 50 and 52.

The cushion 86 is affixed to frame 48 and has a central generally U-shaped recess 104 whose width is substantially equal to the distance between frame members 98. The removable central cushion section 88 is complimentary to the opening 104 and is slidably supported therein on elongate members 106 which are L-shaped in vertical section and are affixed to the upper inner edge of frame members 96. In order to facilitate sliding movement between cushion 88 and supports 106 and to prevent inordinate wear on the upholstery of cushion 88, metallic members 108 are affixed around the lower margin of cushion 88 and dimensioned for engagement between the angle members 106.

FIG. 2 shows the chair 10 in position above a toilet bowl 110. It can be seen that the width of the chair between the side frames 12 and 14 is wider than the width of toilet bowl 110 and in addition, the lowermost portion of the seat 20 is higher than the upper edge of said toilet bowl. Further, because the lower edge of the rear brace 50 is above the level of the lower edge of seat 20, the chair may be backed by the user so that the cutout portion 104 is positioned above the upper opening of the toilet bowl 110. In order to insure that the cutout is in this position, the user may back the chair 10 until the front brace 48 engages the front edge of the toilet bowl 110. There is no danger of the chair collapsing inwardly because the hinge 58 does not collapse in the forward direction. More importantly, the side frames 12 and 14 are rigidly held in spaced apart relation by the seat frame 84. When the chair is positioned in this manner, the center seat section 84 can be slid forwardly and removed to expose the toilet bowl 110 to the chair occupant.

When it is desired to collapse the chair for transporting the same in an automobile trunk, for example, the seat 20 is first removed. The knee of the rear brace 52 is then moved upwardly to collapse the brace thereby tending to draw the side frames 12 and 14 together. Simultaneously, the front and rear braces 48 and 50 are collapsed rearwardly with the aid of the strut 70. In this manner, the chair can be collapsed so that the side frames 12 and 14 are moved into substantial engagement.

While only a single embodiment of the invention has been illustrated and described, it is not intended to be limited thereby but only by the scope of the appended claims.

I claim:

1. A wheelchair having a pair of opposed side frames each including portions which define front and rear ends thereof, a seat removably mounted on the side frames, wheel means rotatably mounted on each of said side frames, first brace means pivotally mounted at each of its opposite ends to the front ends of said side frames and being collapsible intermediate its ends, second brace means pivotally connected at its opposite ends to the rear ends of said side frames and also collapsible intermediate its ends, third brace means pivotally connected at its opposite ends to the rear ends of said side frames and being collapsible intermediate its ends, said third brace means being disposed at an elevation of at least equal to that of said seat means, said first and second brace means being pivotally mounted to the side frames for collapsing movement in a generally horizontal direction and the third brace means being collapsible in a direction generally perpendicular to the direction in which said first and second brace means collapses whereby said braces, when uncollapsed, support said side frames in a spaced apart when said seat has been removed, said first and second brace means lying respectively along the front and rear margins of said wheelchair when extended, said seat including a relatively rigid frame having lateral sides each of which includes means for being releasably mounted on one of said side frames, the width of said seat means being substantially equal to the distance between said side frames when said brace means are fully extended, said seat preventing the collapse of said first second and third brace means when mounted on said side frames, said seat means also having a central portion which is removably mounted on said seat frame to provide a central opening through said seat without affecting the rigidity of the seat frame, said second brace means being disposed at an elevation at least equal to that of the lower edge of said seat means, the area below said seat means being otherwise unobstructed to permit said wheelchair to be backed over a toilet bowl.

2. A wheelchair having a pair of opposed side frames each including portions which define front and rear ends thereof, wheel means rotatably mounted on each of said side frames, first brace means pivotally mounted at each of its opposite ends to the front ends of said side frames and being collapsible intermediate its ends, second brace means pivotally connected at its opposite ends to the rear ends of said side frames and having portions pivotally connected for collapsing in the same direction as said first brace means, third brace means pivotally connected at its opposite ends to the rear ends of said side frames and also collapsible intermediate its ends, said third brace means being disposed at an elevation of at least equal to that of said seat means, said first and second brace means being pivotally mounted to the side frames for collapsing movement in a generally horizontal direction and said third brace means being collapsible in a direction generally vertical, said first and second brace means lying respectively along the front and rear margins of said wheelchair when extended, seat means including a relatively rigid frame, said seat means having lateral sides each of which includes means for being releasably mounted on one of said side frames, the width of said seat means being substantially equal to the distance between said side frames when said brace means are fully extended, said seat means preventing the collapse of said first second and third brace means when mounted on said side frames, said seat means also having a central portion which is removably mounted on said frame to provide a central opening through said seat, said second brace means being disposed at an elevation at least equal to that of the lower edge of said seat means, the area below said seat means being otherwise unobstructed to permit said wheelchair to be backed over a toilet bowl, said seat means including a pair of side secitons affixed to said frame, and strut means disposed beneath one of said side sections and, interconnecting said first and second brace means whereby the same will move in unison and in the same direction.

3. The wheelchair set forth in claim 2 wherein said third brace means includes first and second brace members connected at their opposite ends for pivotal movement about a generally horizontal axis and pivotally interconnected at their opposite ends, one of said brace members having stop means where engaging the other member to prevent downward pivotal movement of said members past the point where they are in general alignment.

* * * * *